(12) United States Patent
Mutsaers et al.

(10) Patent No.: US 7,076,986 B2
(45) Date of Patent: Jul. 18, 2006

(54) PROCESS FOR FORMING A LINKING ELEMENT FOR A PUSH BELT FOR A CONTINUOUSLY VARIABLE TRANSMISSION

(75) Inventors: Robert Arnoldus Andreas Mutsaers, Oisterwijk (NL); Lambertus Cornelis Hendrikus Buysen, Heeze (NL); Jeroen Herman van Liempd, Bavel (NL); Marc André Mussaeus, Eindhoven (NL)

(73) Assignee: Van Doorne's Transmissie B.V. (NL)

( * ) Notice: Subject to any disclaimer, the term of this patent is extended or adjusted under 35 U.S.C. 154(b) by 0 days.

(21) Appl. No.: 10/867,454

(22) Filed: Jun. 14, 2004

(65) Prior Publication Data
US 2004/0221569 A1    Nov. 11, 2004

Related U.S. Application Data

(63) Continuation of application No. PCT/NL02/00839, filed on Dec. 17, 2002.

(30) Foreign Application Priority Data
Dec. 21, 2001    (NL) .................................... 1019639

(51) Int. Cl.
    *B21D 28/04*    (2006.01)
    *B21D 28/10*    (2006.01)
(52) U.S. Cl. .............................. 72/337; 72/327; 72/339; 72/420; 83/40; 83/55; 83/412
(58) Field of Classification Search ................. 72/327, 72/339, 330, 331, 337, 412, 420; 83/40, 83/55, 412
See application file for complete search history.

(56) References Cited

U.S. PATENT DOCUMENTS

| | | | | |
|---|---|---|---|---|
| 4,320,647 A | * | 3/1982 | Kummeling et al. | ......... 72/203 |
| 4,826,473 A | * | 5/1989 | Miyawaki | ................... 474/240 |
| 4,894,049 A | * | 1/1990 | Koppelaars | ................. 474/240 |
| 6,427,512 B1 | * | 8/2002 | Suzuki et al. | ................. 72/337 |
| 6,453,716 B1 | * | 9/2002 | Suzuki | ........................ 72/329 |
| 6,526,798 B1 | * | 3/2003 | Suzuki | ........................ 72/330 |
| 6,742,373 B1 | * | 6/2004 | Wakui | ......................... 72/327 |
| 6,904,782 B1 | * | 6/2005 | Suzuki | ........................ 72/329 |
| 6,951,124 B1 | * | 10/2005 | Kanamaru et al. | ............ 72/336 |

* cited by examiner

*Primary Examiner*—David Jones
(74) *Attorney, Agent, or Firm*—Ryan A. Schneider; Troutman Sanders LLP

(57) ABSTRACT

In a process for forming a linking element for a push belt for a continuously variable transmission, material is displaced from a central portion of the linking element during a blanking process, which central portion is substantially centrally located in the horizontal transverse direction. A blanking member which is applied during the blanking process, comprises a shaping surface which abuts against a front surface or a back surface of the linking element under the influence of pressure during the blanking process. The blanking member is provided with a relatively elevated central portion, which serves to displace material from the central portion of the linking element during the blanking process.

5 Claims, 10 Drawing Sheets

PROCESS FOR FORMING A LINKING ELEMENT FOR A PUSH BELT FOR A CONTINUOUSLY VARIABLE TRANSMISSION

BENEFIT CLAIMS

This application is a continuation of International Application No. PCT/NL02/00839, with an international filing date of 17 Dec. 2002, published in English under PCT Article 21(2), which has priority to NL 1019639, filed 21 Dec. 2001.

FIELD OF THE INVENTION

The present invention relates to a process for forming a linking element which is designed to be part of a push belt for a continuously variable transmission.

BACKGROUND OF THE INVENTION

A push belt for a continuously variable transmission is generally known. Such a push belt usually comprises two bundles of endless bands being shaped like a closed loop, which are also indicated as rings, and which function as carriers of a relatively large number of linking elements or transverse elements. The linking elements are movably arranged along the entire circumference of the bands, wherein they are able to transmit forces which are related to a movement of the push belt during operation.

In the following description of a linking element, the mentioned directions refer to the situation in which the linking element is part of the push belt. A longitudinal direction of the linking element corresponds to a circumferential direction of the push belt. A vertical transverse direction of the linking element corresponds to a radial direction of the push belt. A horizontal transverse direction of the linking element corresponds to a direction perpendicular to both the longitudinal direction and the vertical transverse direction. The indication of any linking element as subsequent linking element or previous linking element with respect to an adjacent linking element is related to a direction of movement of the push belt.

In the horizontal transverse direction, the linking element is on both sides provided with recesses for at least partially receiving the bundles of bands. For the purpose of supporting the bundles of bands, the linking element comprises carrying surfaces. For the purpose of contact between the linking element and pulley sheaves of a continuously variable transmission, the linking element is on both sides provided with pulley sheave contact surfaces, in the horizontal transverse direction, which are divergent in the direction of the carrying surfaces.

In the vertical transverse direction, the linking element comprises successively a basic portion, a neck portion of which the dimensions in the horizontal transverse direction are smaller than those of the basic portion, and a top portion of which the dimensions in the horizontal transverse direction at the location of the connection to the neck portion are larger than those of the neck portion. The basis portion comprises the carrying surfaces and the pulley sheave contact surfaces. At the push belt, the basic portion is located at the side of the inner circumference of the push belt, whereas the top portion is located at the side of the outer circumference of the push belt. An important function of the neck portion is interconnecting the basic portion and the top portion.

The linking element has two main body surfaces, namely a front surface and a back surface, which extend substantially parallel with respect to each other, substantially perpendicular to the longitudinal direction. At least a part of the front surface of the linking element is designed to abut against at least a part of the back surface of a subsequent linking element in the push belt, whereas at least a part of the back surface of the linking element is designed to abut against at least a part of the front surface of a previous linking element in the push belt.

In the push belt, two adjacent linking elements are tiltable with respect to each other about a tilting line, which is usually defined at the front surface of each linking element, and which extends along the entire width of the linking element. Usually, the tilting line is formed as a convex transition region at the front surface, which constitutes an even and round transition of two portions of the front surface, which are oriented at a relatively small angle with respect to each other. An important function of the tilting line is guaranteeing mutual contact between adjacent linking elements which during operation of the push belt are located between the pulley sheaves of a pulley. The tilting line is intended to arrange that the forces which are related to a movement of the push belt are transmitted from any linking element to a subsequent linking element in a controlled manner, accompanied by a surface pressure which is regarded as allowable, and which is among others determined by the width of the linking element, i.e. the length of the tilting line, and by the extent to which the convex transition region forming the tilting line is curved, so that undesirable very high local load of the linking elements when they are located in the mutually tilted position can be prevented, together with breakage of the linking elements.

The linking element is manufactured from basic material being shaped like a sheet by means of a blanking process. In the blanking process, a cutting member and a supporting member are applied, wherein the cutting member is designed to cut the linking element from the basic material under the influence of a cutting force, and wherein the supporting member is designed to support the linking element by a supporting force during the blanking process. During the blanking process, the cutting member penetrates the basic material under the influence of pressure, wherein a mutual movement of the cut linking element and the basic material is allowed. At that moment, the linking element is clamped between a cutting surface of the cutting member and a supporting surface of the supporting member. In this process, it is a known aspiration to organize the blanking process such that a quality of a side surface of the cut product is obtained, which is as high as possible, of course balanced with respect to the effectiveness of the blanking process, including the cost of the blanking tools. From the die-cutting technique, a large number of process parameters are known, which are influential in this process, like a play between cutting member and mould in which the cutting member moves during a blanking movement, an extent to which the mould is bevelled, the cutting force and the supporting force.

Preferably, during the blanking process, the front surface of the linking element is formed at the side of the supporting member, whereas the back surface is formed at the side of the cutting member. Due to the pressure being prevalent during the blanking process, the shape of the supporting surface is then a determining factor regarding the shape of the front surface of the linking element, whereas the shape of the cutting surface is a determining factor regarding the shape of the back surface of the linking element.

It has appeared in practice, that breakage, in particular fatigue breakage, of the linking elements can occur unexpectedly, while a clear cause can not be indicated. Further, it has appeared that in a large number of the cases the breakage occurs in the basic portion, wherein an end of the line of the break, which is identified as the end where the breakage initiates, is located in the region where the carrying surface is connected to the neck portion. It is an important objective of the present invention to provide for a suitable process for forming a linking element, wherein linking elements having a reduced chance of danger are obtained.

SUMMARY OF THE INVENTION

Among others, the insight that as a result of the known blanking process, it apparently may occur that a central portion of a main body surface of the linking element, which is centrally located in the horizontal transverse direction, is somewhat thicker than other parts thereof, i.e. has a somewhat larger dimension in the longitudinal direction, wherein in the circumferential direction of the push belt, play is present in-between the linking elements, at side portions which are located on both sides of the central portion, underlies the present invention. According to this insight, such a thicker central portion of the linking element comprises a central portion of the tilting line, wherein the central portion can also extend as far as in the neck portion.

As a result thereof, the pressure loads or pushing forces between adjacent linking elements as occurring during operation of the push belt will unintentionally concentrate themselves in the thicker central portion of the tilting line, contrary to an even pressure distribution along the entire length of the tilting line, which may be expected according to the design, so that the tension in the material of the linking elements may locally exceed beyond a theoretical design value. Moreover, the pushing force between two linking elements, which in first instance acts on the area of the thicker central portion, together with a friction force between the linking elements and the pulley sheaves, which always acts on the area of the pulley sheave contact surfaces, generates a torque, as a result of which the linking elements unexpectedly also experience flexural strain. As a result, the linking element shall be inclined to bend, such that the linking element assumes a position in which the pushing force does not only act on the area of the thicker central portion, but also on the area of the side portions.

For that matter, the play is very small, and is in an order of magnitude of about 10 µm. It would therefore be obvious to regard the thickened part of the central portion as negligible. Among others, the present invention is based on the insight that the thickened part of the central portion is still an important factor regarding the occurrence of breakage in the linking element, because the effect of the bending of the linking element is more or less cumulative, which means that an already bent linking element will have to bend further if this linking element abuts against a preceding linking element which is also bent itself as a result of the above-described interplay of forces. A first linking element in a series of adjacent and bent linking elements will then bend substantially, even if the extent to which the central portion is thickened is relatively small per linking element. Moreover, the flexural strain and bending will vary during a revolution of the push belt, dependent on the pushing force, when the push belt is applied in a continuously variable transmission, as a result of which fatigue breakage may occur.

According to a further insight, the development of the thicker central portion is a consequence of the blanking process, which apparently manifests itself in an intensified manner as side effect of amendments and improvements of the blanking process, as generally are pursued.

Based on the insight as described in the above, the present invention proposes to decrease the chance of breakage of the linking elements by adjusting the shape of the linking elements, namely such that it is assured that in the push belt, adjacent linking elements abut against each other at least at the side portions, so that bending about the central portion can not take place. The set objective can be achieved according to the present invention by adjusting the blanking tools with which the linking elements are formed and more in particular the cutting member and/or the supporting member, which can be established in different ways. A possibility is to adapt the blanking tools for displacing material from the central portion of the linking element under the influence of pressure during the blanking process. Another possibility is to adapt the blanking tools to exert relatively less pressure at the area of the side portions during the blanking process. Both measures prevent the development of a thickened central portion, and may be applied together.

BRIEF DESCRIPTION OF THE DRAWINGS

The invention will be explained in more detail on the basis of the following description of preferred embodiments of the invention with reference to the drawing, in which equal reference signs indicate equal or similar parts, and in which.

DETAILED DESCRIPTION OF THE INVENTION

Figure 1:
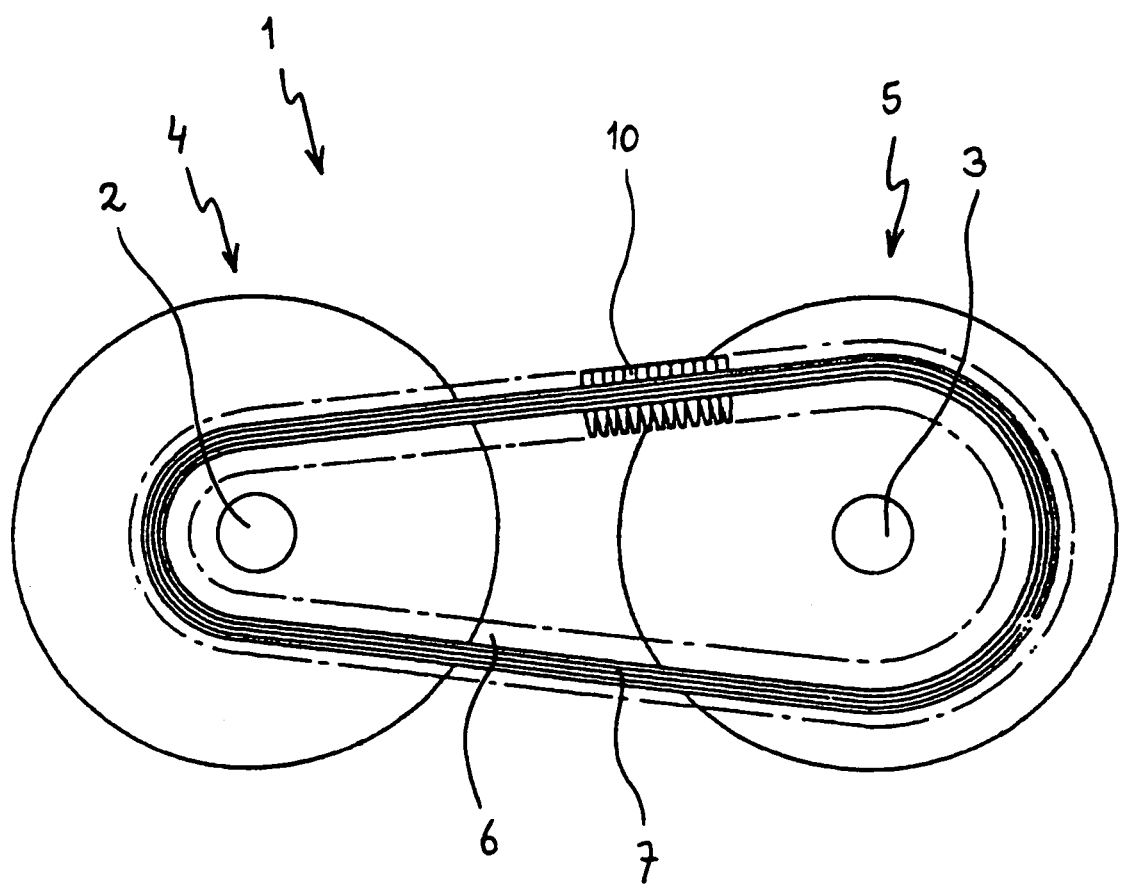
FIG. 1 is a diagrammatical side view of a continuously variable transmission having a push belt.

FIG. 1 diagrammatically shows a continuously variable transmission, such as for utilization in a motor vehicle. The continuously variable transmission is indicated in general by the reference sign 1.

The continuously variable transmission 1 comprises two pulleys 4, 5 being arranged on separate pulley shafts 2, 3. An endless push. belt 6 being shaped like a closed loop is arranged around the pulleys 4, 5 and serves for transmitting torque between the pulley shafts 2, 3. The pulleys 4, 5 are each provided with two pulley sheaves, wherein the push belt 6 is positioned and clamped between these two pulley sheaves, so that with the help of friction a force may be transmitted between the pulleys 4, 5 and the push belt 6.

The push belt 6 comprises at least one endless carrier 7, which is usually composed of a number of bands. Linking elements 10 are arranged along the entire length of the carrier 7, wherein the linking elements 10 are mutually adjacent to each other and are movable in circumferential direction with respect to the carrier 7. For the sake of simplicity, only a few of these linking elements 10 are shown in FIG. 1.

Figure 2:
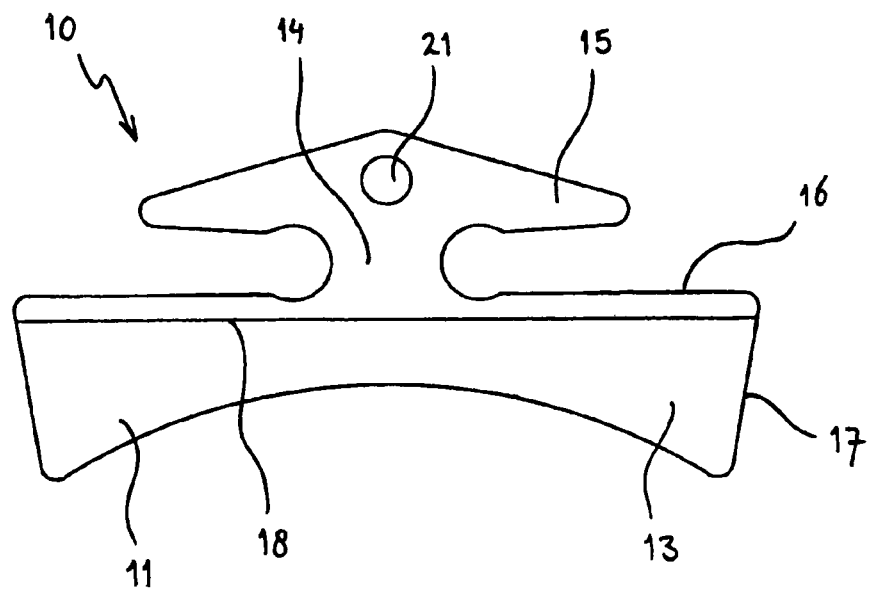
FIG. 2 is a front view of a linking element for a push belt for a continuously variable transmission.
Figure 3:
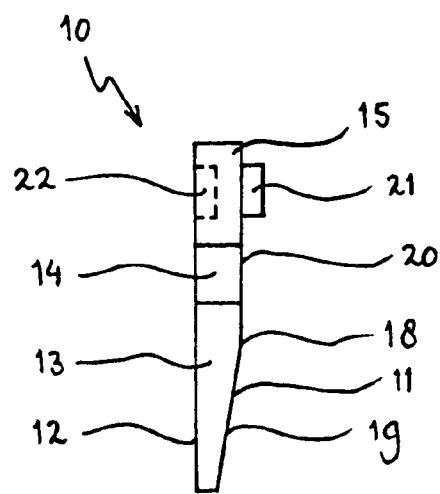
FIG. 3 is a side view of the linking element which is shown in FIG. 2.

FIGS. 2 and 3 show a linking element 10. A front surface of the linking element 10 is indicated in general by the reference sign 11, whereas a back surface of the linking element 10 is indicated in general by the reference sign 12. In the following, both the front surface 11 and the back surface 12 are also indicated as main body surface 11, 12.

In the vertical transverse direction, the linking element 10 comprises successively a basic portion 13, a relatively narrow neck portion 14 and a top portion 15 which is shaped like the tip of an arrow. In the push belt 6, the basic portion 13 is located at the side of the inner circumference of the push belt 6, whereas the top portion 15 is located at the side of the outer circumference of the push belt 6. Furthermore, in a push belt 6, at least a part of the front surface 11 of the linking element 10 abuts against at least a part of the back surface 12 of a subsequent linking element 10, whereas at least a part of the back surface 12 of the linking element 10 abuts against at least a part of the front surface 11 of a preceding linking element 10. At the transition to the neck portion 14, the basic portion 13 of the linking element 10 as shown in FIG. 2 comprises two carrying surfaces 16 which serve for supporting two carriers 7. Furthermore, the basic portion 13 comprises two pulley sheave contact surfaces 17. When the linking element 10 moves over the pulley 4, 5, contact between the linking element 10 and contact surfaces of the pulley sheaves is established through the pulley sheave contact surfaces 17.

At the front surface 11 of the linking element 10, a tilting line 18 is defined. The tilting line 18 is located at the basic portion 13 and extends in the shown example along the entire width of the linking element 10. In FIG. 3, it can be seen that in this example the tilting line 18 is located at the area where a slanting portion 19 of the front surface 11 of the linking element 10 is connected to a straight portion 20 of the front surface 11. An important function of the tilting line 18 is guaranteeing mutual contact between adjacent linking elements 10, when these linking elements 10 move over one of the pulleys 4, 5 during a movement of the push belt 6, for example.

Also, at the front surface 11 of the linking element 10, a projection 21 is arranged. In the shown example, the projection 21 is located at the top portion 15, and corresponds to a hole in the back surface 12. In FIG. 3, the hole is depicted by means of dashed lines and indicated by the reference sign 22. In the push belt 6, the projection 21 of the linking element 10 is at least partially located inside the hole 22 of a subsequent linking element 10. The projection 21 and the corresponding hole 22 serve to prevent mutual displacement of adjacent linking elements 10 in a plane perpendicular to the circumferential direction of the push belt 6.

The linking element 10 is manufactured by means of a blanking process, wherein a supporting member and a cutting member are applied. The supporting member serves to support the linking element during the blanking process, whereas the cutting member serves to cut the linking element from basic material being shaped like a sheet during the blanking process.

In the following, it is continually assumed that during the blanking process, the front surface 11 of the linking element 10 is formed by a supporting surface of the supporting member, whereas the back surface 12 of the linking element 10 is formed by a cutting surface of the cutting member. That does not alter the fact that the invention also relates to the situation in which the front surface 11 is formed by the cutting surface and the back surface 12 is formed by the supporting surface.

The circumference of both the supporting surface and the cutting surface has substantially the same shape as the circumference of the linking element 10 which has to be cut, wherein these surfaces, like the linking element 10, comprise a basic portion, a relatively narrow neck portion and a top portion which is shaped like the tip of an arrow. In the following description of the cutting member and the supporting member, a vertical height corresponds to the direction in which the basic portion, the neck portion and the top portion are successively located. A longitudinal direction corresponds to a direction perpendicular to the supporting surface and the cutting surface, respectively. A horizontal width corresponds to a direction perpendicular to both the longitudinal direction and the vertical height.

Besides the function of supporting the linking elements 10, another important function may be assigned to the supporting member, namely pushing cut linking elements 10 out of a blanking device in which the supporting member is arranged, being movable in a longitudinal direction.

A blanking process known per se will now be explained on the basis of FIGS. 4 and 5a to 5d.

Figure 4:
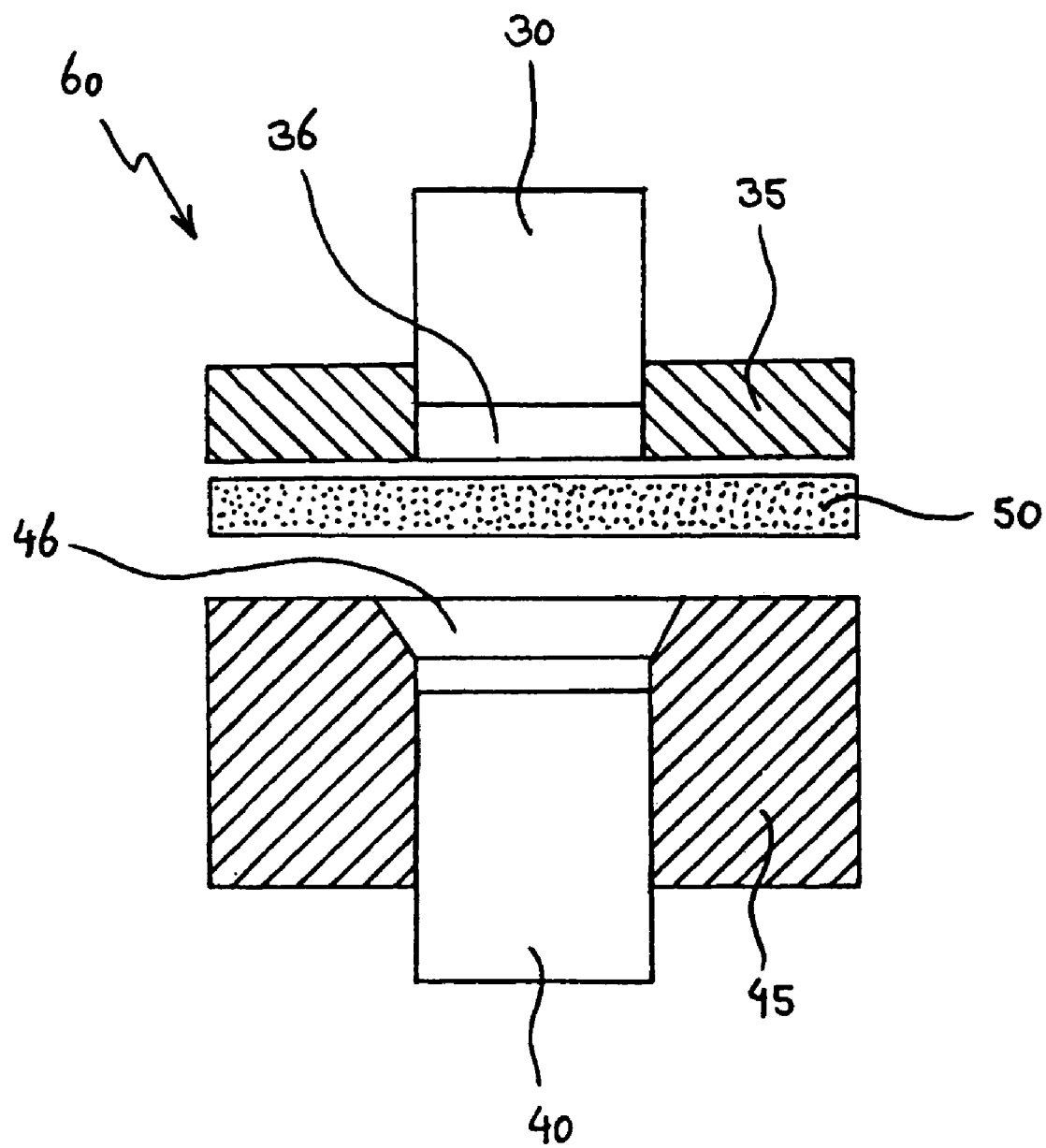
FIG. 4 shows a diagrammatic longitudinal section of a blanking area of a blanking device, as well as basic material being positioned in there.

In FIG. 4, a blanking area of a blanking device 60 and basic material 50 being positioned in there are diagrammatically depicted. The blanking device 60 comprises a cutting member 30 which is designed to cut the linking element 10 from the basic material. The cutting member 30 is inserted in a guiding accommodation 36 in a guiding sheet 35, an important function of which is guiding the cutting member 30 during a blanking movement. A supporting member 40 is in line with the cutting member 30, which is designed to support the linking element 10 during the blanking process. As already remarked in the foregoing, the circumference of both the cutting member 30 and the supporting member 40 corresponds substantially to the circumference of the linking element 10 which has to be cut. The supporting member 40 is inserted in a receiving accommodation 46 in a mould 45, an important function of which is guiding the cutting member 30, the supporting member 40, as well as the linking element 10 during a blanking movement. The inner circumference of the receiving accommodation 46 corresponds substantially to the circumference of the cutting member 30, the supporting member 40, as well as the linking element 10. The basic material 50 being shaped like a sheet is initially located between the cutting member 30 and the guiding sheet 35 on the one hand, and the supporting member 40 and the mould 45 on the other hand.

In the following, a blanking movement is described on the basis of FIGS. 5a to 5d, in which different successive stages of the blanking movement are depicted.

Figure 5A:
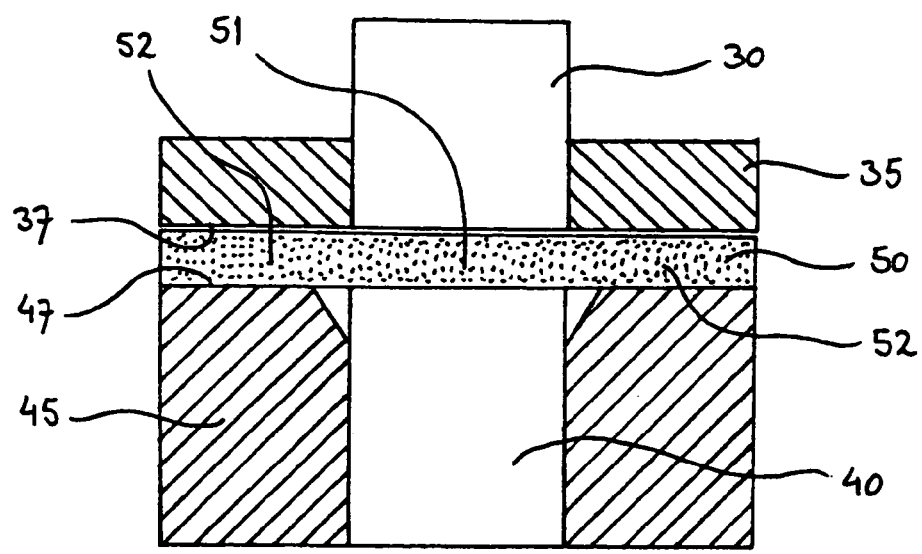
FIG. 5a diagrammatically shows a first stage of a blanking movement.

In a first stage or initial stage, as diagrammatically shown in FIG. 5a, a blanking portion 51 of the basic material 50 is clamped between the cutting member 30 on the one hand, and the supporting member 40 on the other hand, while a rest portion 52 is clamped between a guiding surface 37 of the guiding sheet 35 and a mould surface 47 of the mould 45. In the process, the clamping forces act in a direction substantially perpendicular to the guiding surface 37 and the mould surface 47. The blanking portion 51 is the portion of the basic material 50 which is destined to form the linking element 10.

Figure 5B:
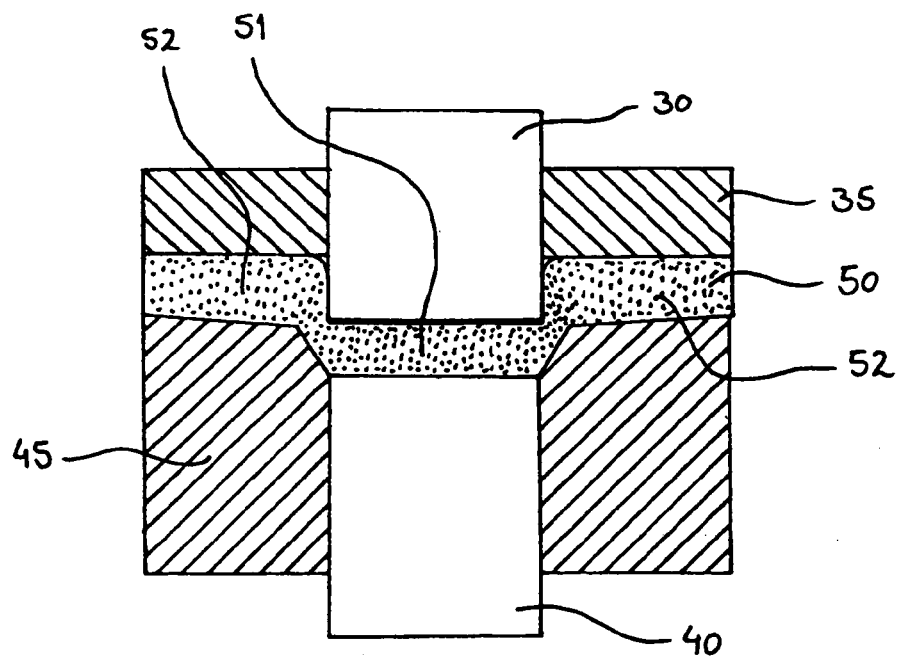
FIG. 5b diagrammatically shows a second stage of the blanking movement.

In a second stage, as diagrammatically shown in FIG. 5b, the entirety of cutting member 30, blanking portion 51 and supporting member 40 is moved with respect to the guiding sheet 35, the rest portion 52 and the mould 45, under the influence of pressure. In the process, a direction of movement is substantially perpendicular to the supporting surface 37 and the mould surface 47. As a result of the mutual movement, the cutting member 30 penetrates the basic material 50, and the blanking portion 51 is pressed in the receiving accommodation 46 of the mould 45.

Figure 5C:
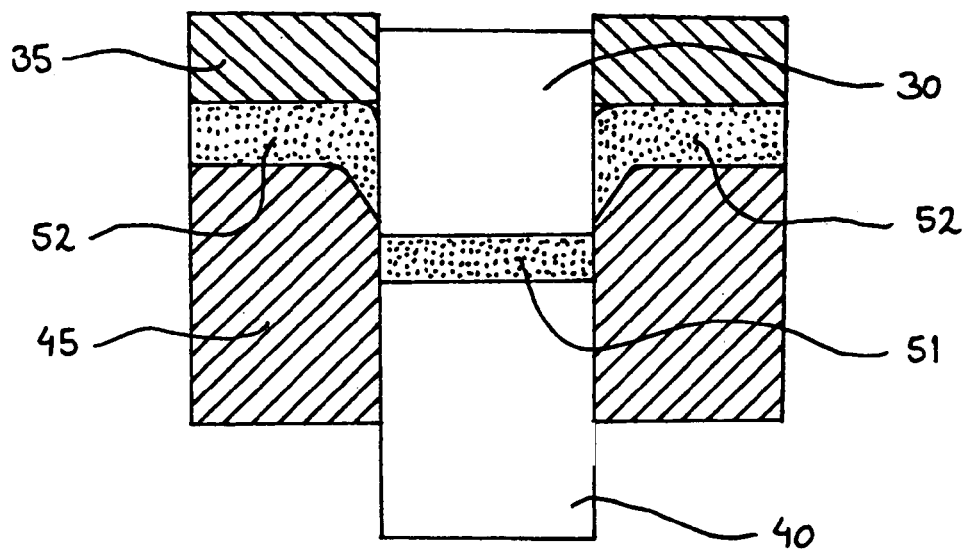
FIG. 5c diagrammatically shows a third stage of the blanking movement.

In a third stage, as diagrammatically shown in FIG. 5c, the blanking portion 51 becomes completely detached from the rest portion 52 as a result of the continuing mutual movement. Hereafter, the movement of the entirety of cutting member 30, blanking portion 51 and supporting member 40 is reversed with respect to the guiding sheet 35, the rest portion 52 and the mould 45, until the position of these components corresponds substantially to the position they had in the first stage, an important difference being the fact that the blanking portion 51 has now become detached from the rest portion 52.

Figure 5D:
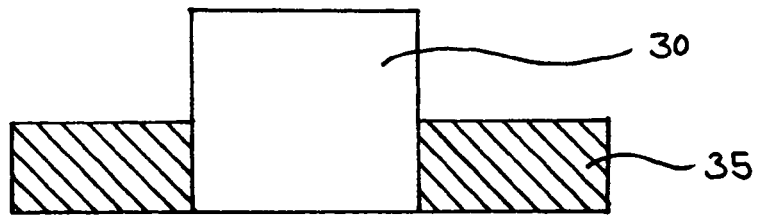
FIG. 5d diagrammatically shows a fourth stage of the blanking movement.
Figure 5D:
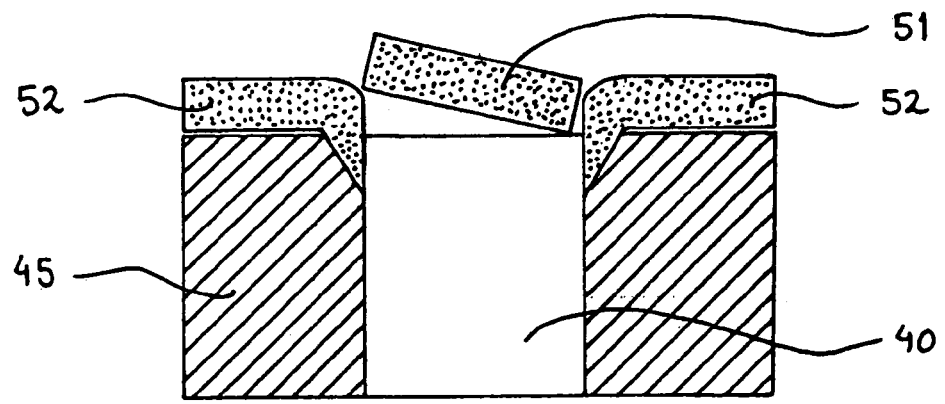

In a fourth stage, as diagrammatically shown in FIG. 5d, the cutting member 30 and the guiding sheet 35 on the one hand, and the supporting member 40 and the mould 45 on the other hand, are mutually moved in such a way that the cutting member 30 and the guiding sheet 35 are retracted with respect to the blanking portion 51 and the rest portion 52, as a result of which these portions are released and may be taken out. In the process, the supporting member 40 may function as pushing member.

Figure 6A:
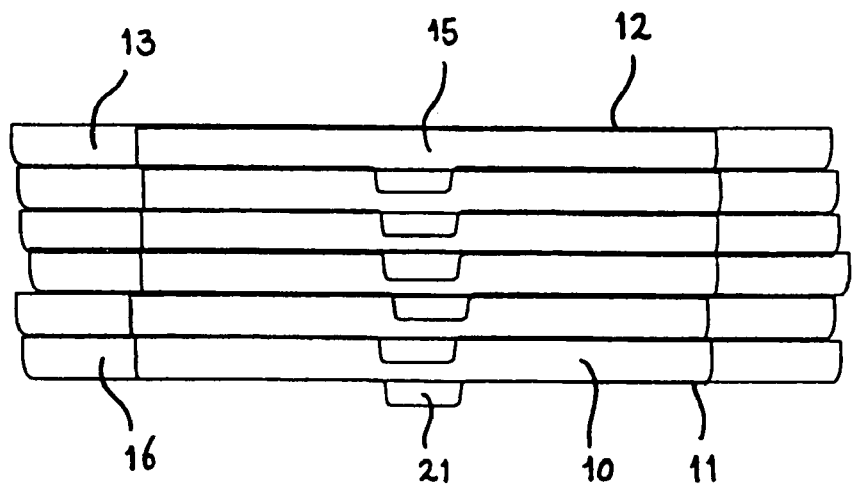
FIG. 6a is a top view of a number of adjacent linking elements being arranged according to a theoretical configuration.

FIG. 6a shows a number of adjacent linking elements 10, which is part of a push. belt 6, according to a theoretical configuration. In this configuration, a major part of the main body surfaces 11, 12 of the linking elements 10 is completely flat, and the linking elements 10 abut against each other along their entire width. Due to this, the pushing forces which act on the linking elements 10 during operation of the push belt 6, are evenly divided among the main body, surfaces 11, 12. Locally, the tensions in the material of the linking element 10 always remain beneath a theoretical design value.

When the shown linking elements 10 move over a pulley 4, 5 during operation of the push belt 6, mutual contact between adjacent linking elements 10 takes place along the entire length of the tilting line 18. The pushing forces are then evenly divided among the tilting line 18, wherein local tensions in the material of the linking element 10 at the position of the tilting line 18 always remain beneath a theoretical design value.

On the basis of the foregoing, it will be clear that in the theoretical configuration, the tensions in the material of the linking elements 10 always remain beneath a theoretical design value, irrespective of the situation. Due to this, breakage as a result of stress concentration at the main body surfaces 11, 12 of the linking element 10 will not occur.

Figure 6B:
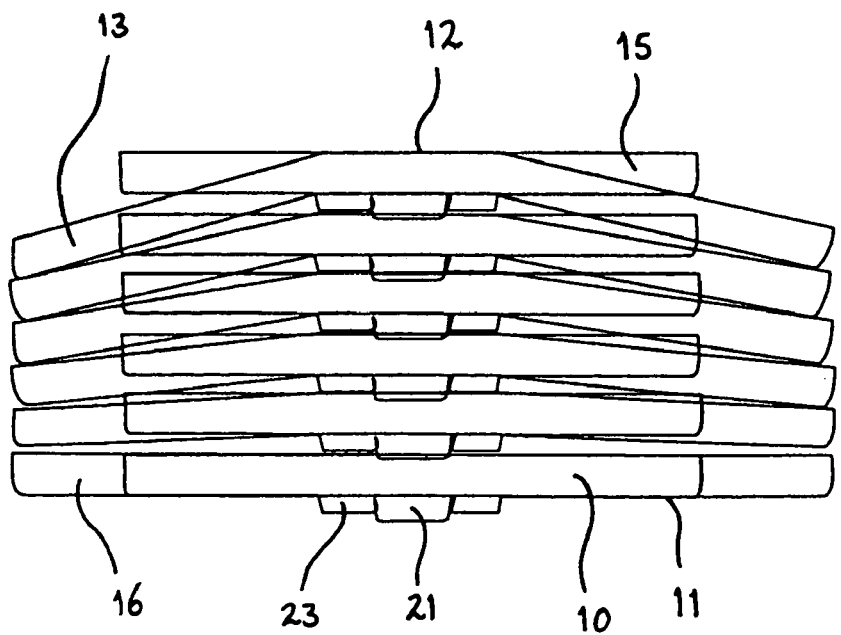
FIG. 6b is a top view of a number of adjacent linking elements being arranged according to a configuration which appears to occur in practice.

FIG. 6b shows a number of adjacent linking elements 10, which is part of a push belt 6, according to a configuration which appears to occur in practice. In this configuration, a central portion 23 of the front surface 11 of the linking elements 10, which is centrally located in the horizontal transverse direction, is thicker than the other portions of the front surface 11, as a result of which the linking elements 10 abut exclusively against the central portion 23 in unloaded condition. It is remarked that for the sake of clarity, in the figure, the linking elements 10 are depicted as extremely thick at the position of the central portion 23. The usually applied linking elements 10 have a nominal thickness of between 1 and 3 mm, whereas the increase in thickness at the position of the central portion 23 is typically about 10 µm.

When pushing forces act on the linking elements 10 during operation of the push belt 6, the configuration as shown in FIG. 6b develops. The pushing forces concentrate themselves in the central portion 23, as a result of which tensions in the material of the linking element 10 can locally exceed beyond a theoretical design value, which can lead to breakage of the linking element 10.

In the case that the shown linking elements 10 move over a pulley 4, 5 during operation of the push belt 6, mutual contact between adjacent linking elements 10 takes place along only a portion of the tilting line 18 which is part of the central portion 23. In the process, pushing forces between adjacent linking elements 10 will concentrate themselves in this portion of the tilting line 18, as a result of which local tensions in the material of the linking element 10 at the area of this portion may exceed beyond a theoretical design Value, which can lead to breakage of the linking element 10.

Moreover, the pushing force between two linking elements 10, which in first instance acts on the area of the central portion 23, together with a friction force between the linking elements 10 and the pulley sheaves, which always acts on the area of the pulley sheave contact surfaces 17, generates a torque, as a result of which the linking elements 10 also experience flexural strain. As a result, the linking elements 10 will bend, such that the linking elements 10 assume positions in which the linking elements 10 do not only abut against each other at the area of the central portion 23, but also abut against each other at the area of the pulley sheave contact surfaces 17. As can clearly be seen in FIG. 6b, the effect of these bendings is more or less cumulative, which means that an already bent linking element 10 will have to bend further if this linking element 10 abuts against a preceding linking element 10 which is also bent itself as a result of the above-described interplay of forces. A first linking element 10 in a series of adjacent and bent linking elements 10 will then bend substantially, even if the extent to which the central portion 23 is thickened is relatively small per linking element 10. Moreover, the flexural strain and bending will-vary during a revolution of the push belt 6, dependent on the pushing force, when the push belt 6 is applied in a continuously variable transmission 1, as a result of which fatigue breakage may occur.

According to an important insight underlying the present invention, the development of the thicker central portion 23 is a consequence of the blanking process.

With respect to the following, it is true that the term "blanking member" relates to both the supporting member and the cutting member, and that the term "shaping surface" relates to both the supporting surface and the cutting surface.

Figure 7:
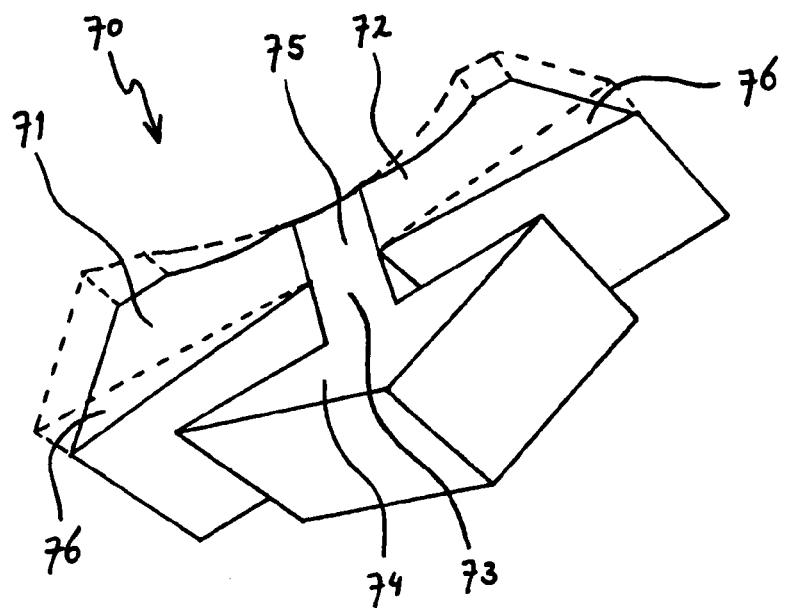
FIG. 7 is a perspective view of a first preferred embodiment of a blanking member according to the invention.

FIG. 7 shows a first preferred embodiment of a blanking member according to the invention, which is indicated in general by the reference sign 70.

The blanking member 70 comprises a shaping surface 71 which is designed to abut against a main body surface 11, 12 of a linking element 10, under the influence of pressure, during the manufacture of the linking element 10. For the sake of simplicity, not all details of the shaping surface 71 are depicted in FIG. 7. For example, the shape of the shaping surface 71 which is adapted to making the projection 21 is not shown.

As already remarked in the foregoing, the shaping surface 71, like the linking element 10, is provided with a basic portion 72, a neck portion 73 and a top portion 74. In the following, the terms "bottom" and "top" are related to an orientation of the blanking member 70 in which the top portion 74 is located at the top, and wherein the basic portion 72 is located at the bottom.

At both sides of a central portion 75, which is centrally located in the horizontal direction, the basic portion 72 has portions 76 being recessed relative to the plane of the central portion 75. In FIG. 7, the location of a basic portion extending entirely in the plane of the central portion 75 is indicated by means of dashed lines.

Figure 8:
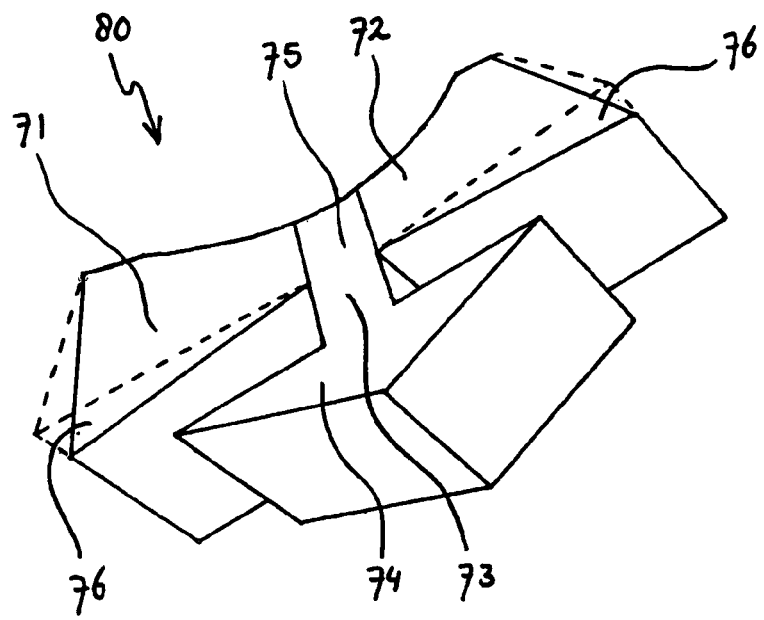
FIG. 8 is a perspective view of a second preferred embodiment of the blanking member according to the invention.

Preferably, the recessed portions 76 are shaped such that the dimensions in the longitudinal direction of these portions 76 decrease in the direction from the central portion 75 to the circumference of the basic portion 72. In an alternative embodiment 80, shown in FIG. 8, the dimensions in the longitudinal direction of these portions 76 also decrease in the vertical direction, going from a bottom side of the basic portion 72 to a top side of the basic portion 72. In the shown example, the dimensions in the longitudinal direction along the entire bottom side of the basic portion 72 equal the dimensions in the longitudinal direction of the central portion 75.

During a blanking process in which the blanking member 70 is applied, the main body surface 11, 12 of the linking element 10 is pressed against the shaping surface 71. At the area of the central portion 75, material of the main body surface 11, 12 is displaced, which flows from the central portion 75 in the horizontal direction on both sides in an accommodation which is offered by the recessed portions 76.

It appears from the above, that when the blanking member 70 is applied, material of the central portion 23 of the linking element 10 is displaced in the direction of the pulley sheave contact surfaces 17. In this way, it is prevented that the central portion 23 is thicker with respect to the other portions of the linking element 10.

When the obtained linking elements 10 are applied in a push belt 6, the linking elements 10 abut against each other at the area of the pulley sheave contact surfaces 17. During operation of the push belt 6, no bending of the linking elements 10 can then occur, because there is no play at the place where the friction force being exerted by the pulley sheaves acts on the linking elements 10. When bending of the linking elements 10 does not occur, fatigue of the linking elements 10 does not occur as well, as a result of which breakage of the linking elements 10 is prevented.

Within the scope of the invention, the shape of the blanking member 70 can be chosen such that the blanking member 70 is suitable for displacing material of the main body surface 11, 12 of the linking element 10 during the blanking process, such that the material at the position of the tilting line 18 is divided evenly among the width of the linking element 10. In that case, a linking element 10 is obtained, wherein at the position of the tilting line 18, the dimensions in the longitudinal direction of the linking element 10 are substantially constant along an essential part of the width of the linking element 10, i.e. the dimensions in the longitudinal direction of the linking element 10 at a first arbitrary position at the tilting line 18 substantially equal the dimensions in the longitudinal direction of the linking element 10 at a second arbitrary position at the tilting line 18. In this case, the expression "substantially equal" means that remaining minuscule differences in thickness have an order of magnitude of maximally a few micrometers. Thus, when the blanking member 70 is applied, a linking element 10 is obtained, wherein substantially the entire tilting line 18 serves for guaranteeing contact and transmitting forces when the linking element 10 moves over a pulley 4, 5.

If the measure relating to displacing material from the central portion 23 in the direction of the pulley sheave contact surfaces 17 is implemented to an extreme extent, then a linking element 10 may be obtained, wherein the dimensions in the longitudinal direction at the position of a region near the pulley sheave contact surfaces 17 are larger than these dimensions at the position of the central portion 23, so that there is no way that bending of the linking element 10 may occur. Nevertheless, if a choice is made in favour of such a solution, the linking element 10 needs to be resistant to relatively high contact pressures as a result of the limited surface of the tilting line 18.

Figure 9:
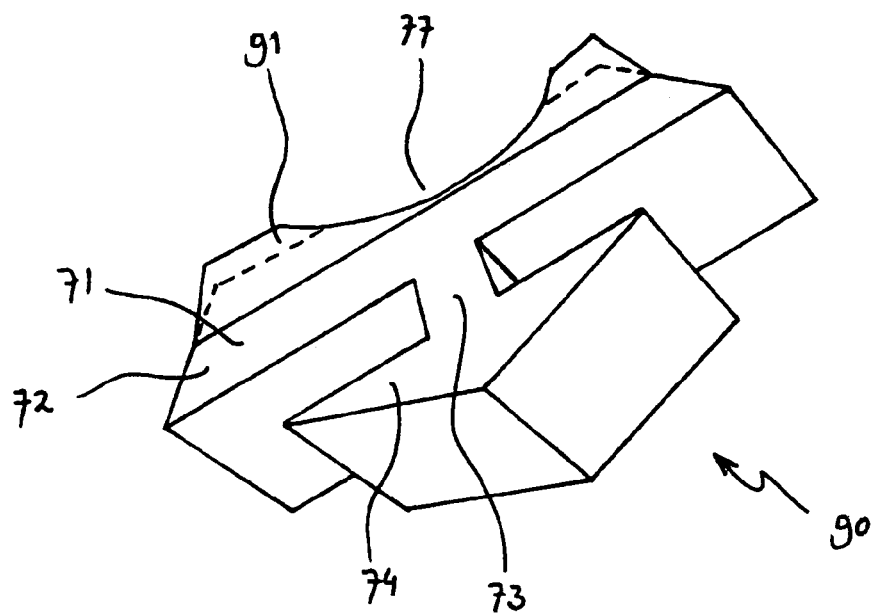
FIG. 9 is a perspective view of a third preferred embodiment of the blanking member according to the invention.
Figure 10:
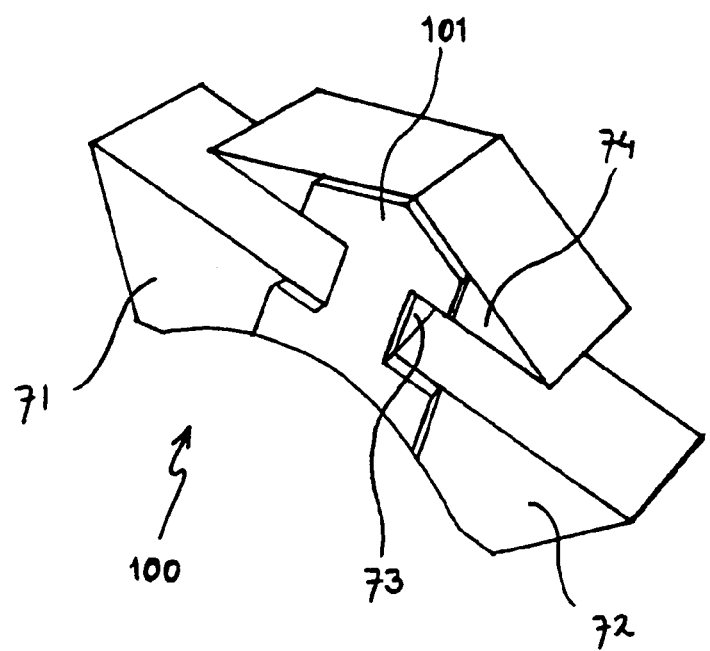
FIG. 10 is a perspective view of a fourth preferred embodiment of the blanking member according to the invention.

FIG. 9 shows a third preferred embodiment of a blanking member according to the invention, which is indicated in general by the reference sign 90.

The basic portion 72 of the blanking member 90 comprises an elevated end portion 91, which is located at the bottom side of the basic portion 72. Starting from the bottom side of the basic portion 72, the end portion 91 slants in the vertical direction. In FIG. 9, the location of a basic portion without elevated end portion 91 is depicted by means of dashed lines.

Starting from the bottom side of the basic portion 72, the end portion 91 can extend beyond a recess 77 in the bottom side of the basic portion 72, which is centrally located in the horizontal direction, as shown in FIG. 9. Another possibility is that the end portion 91 comprises two parts which, in the horizontal direction, are located on both sides of the recess 77.

When the blanking member 90 is applied in a blanking process in which a linking element 10 is manufactured, material is displaced from a region which is located at the end of the basic portion 13 being free in the vertical direction in the direction of the tilting line 18. Thus, when the blanking member 90 is applied, a linking element 10 is obtained, wherein the tilting line 18 in particular on both sides of the central portion 23.is elevated as a result of supply of material from a region which is located at the end of the basic portion 13 being free in the vertical direction. Thus, it is possible to achieve that the linking element 10 has a nearly constant thickness along nearly the entire width thereof and at least at the position of the tilting line 18.

Another possibility to ensure that linking element 10 has a nearly constant thickness at least at the position of the tilting line 18, as a result of which the earlier mentioned bending of the linking elements 10 when these are moving over a pulley 4, 5 will not occur, is according to the invention to be found in executing a blanking member 110 such that the tilting line 18 is formed at the front surface 11 of the linking element 10, beyond the thicker central portion 23 thereof, seen from the carrying surfaces 16 in the direction of the end of the basic portion 13 of the linking element 10 being free in the vertical direction. Among others, the shape of this embodiment is based on the insight that the thicker central portion 23 can be the result of a retraction of material of the linking element 10 near the tilting line 18, which takes place during the blanking process while forming and/or cutting the carrying surfaces 16. Seen in the horizontal transverse direction, such a retraction shall not occur at the area of the neck portion 14, because at that area, the basic material 15 is not intersected near the tilting line 18.

Figure 14:
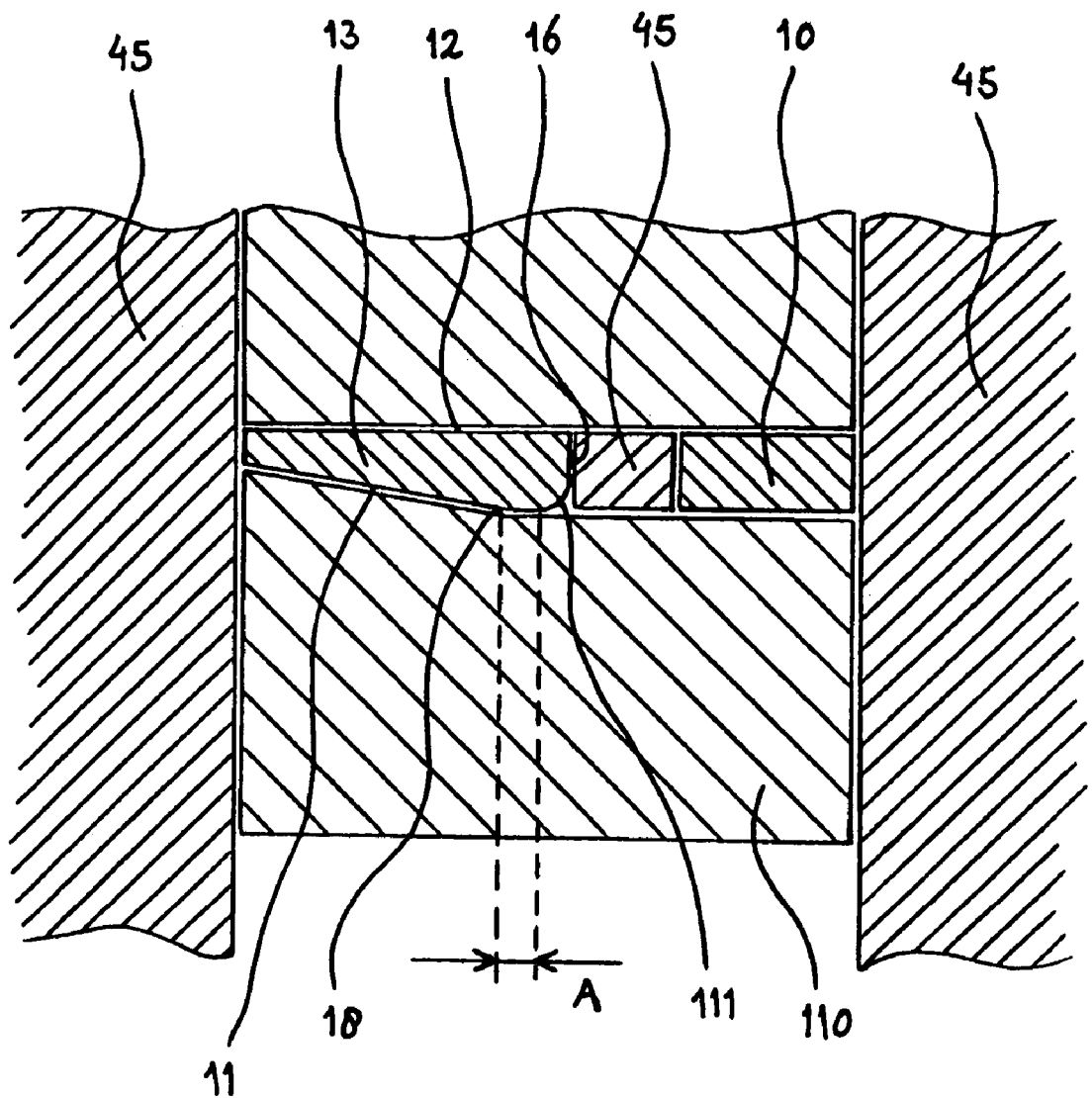
FIG. 14 is a side view of a cross section of a linking element as it is located between blanking tools during a blanking process.

As indicated in FIG. 14, which is a side view of a cross section of a linking element 10 being located between the mould 45, the cutting member 30 and the blanking member 110 which in this example functions as supporting member, a curved transition surface 111 being formed as a result of the retraction extends partially in the front surface 11 of the linking element 10. Seen in the horizontal transverse direction, a tilting line which would be formed in the transition surface 111 near the carrying surfaces 16. would at the area of the carrying surfaces 16 be located lower, i.e. more in the direction of the back surface 12 of the linking element 10, than at the area of the thicker central portion 23 being located at the area of the neck portion 14 in the horizontal transverse direction. Conversely, when the tilting line 18 is formed just outside the transition surface 111, then the linking element 10 has a substantially constant thickness along the entire length of the tilting line 18.

A linking element 10 which is formed when the blanking member 110 is applied, is characterized by the fact that the tilting line 18 and the curved transition surface 111 are located at some distance A from each other. It goes for distance A that this is preferably as small as possible.

FIGS. 10–13 show a fourth preferred embodiment of a blanking member according to the invention, which is indicated in general by the reference sign 100.

The blanking member comprises a portion 101 which is elevated with respect to the shaping surface 71. The elevated portion 101 is centrally located in the horizontal direction, and extends along the entire height of the blanking member 100. In this example, the elevated portion 101 extends along the entire neck portion 73. The dimensions in the horizontal direction of the elevated portion 101 are at the area of the neck portion 73 smaller than these dimensions at the area of the basic portion 72 and the top portion 74.

There are many possibilities for the shape of the elevated portion 101 at the shaping surface 71. For example, it is not necessary that the elevated portion 101 extends along the entire height of the blanking member 100. Instead, the elevated portion 101 can for example exclusively correspond to a portion of the tilting line 18 and the neck portion 14 of the linking element 10 being centrally located in the horizontal transverse direction. It is important that the elevated portion 101 is located substantially centrally in the horizontal direction.

During a blanking process in which the blanking member 100 is applied, a main body surface 11, 12 of the linking element 10 is pressed against the shaping surface 71. At the area of the elevated portion 101, material of the main body surface 11, 12 is displaced. As a result, a linking element 10 is obtained, wherein the central portion 23 in any case is not elevated. When such a linking element 10 is applied in a push belt 6, play between adjacent linking elements 10 at the area of the pulley sheave contact surfaces 17 is absent, as a result of which bending and fatigue of the linking element 10 can not occur and breakage of the linking element 10 is prevented.

When the blanking member 100 is applied in a blanking process in which a linking element 10 is manufactured, then material is displaced from a central portion 23 of the basic portion 13 of the linking element 10, which is centrally located in the horizontal transverse direction. Due to this, a linking element 10 is obtained, wherein the neck portion 14 in any case is not located higher than the tilting line 18. When the blanking member 100 is applied in a blanking process, it is also possible that obtain linking elements 10, wherein the main body surface 11, 12 ascends at the area of the basic portion 13 on both sides in the horizontal transverse direction, starting from the central portion 23. It is already described in the above that fatigue and breakage of such linking elements 10 does not occur.

Figure 11:
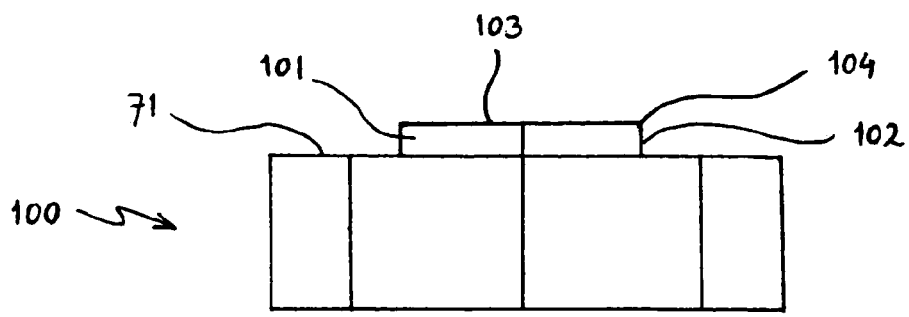
FIG. 11 shows a first possibility of a top view of the blanking member which is shown in FIG. 10.
Figure 12:
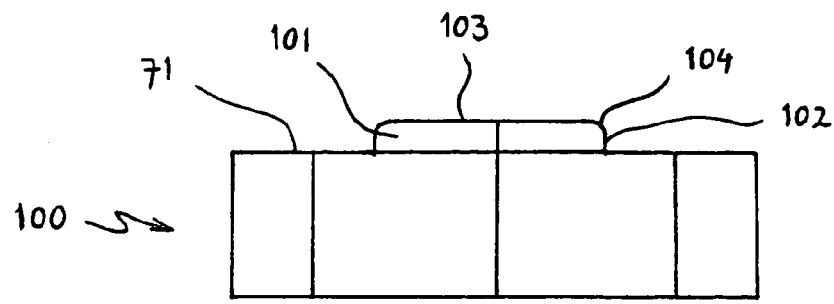
FIG. 12 shows a second possibility of the top view of the blanking member which is shown in FIG. 10.
Figure 13:
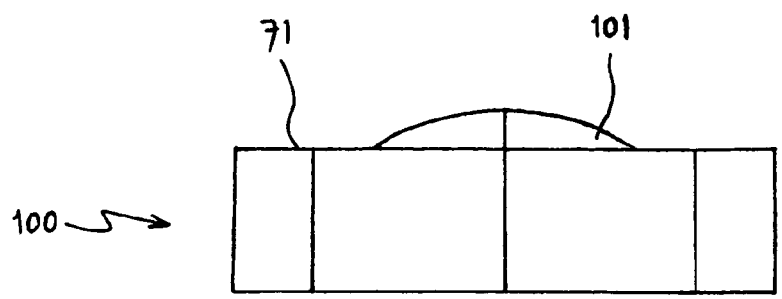
FIG. 13 shows a third possibility of the top view of the blanking member which is shown in FIG. 10.

FIGS. 11–13 show different possibilities for the shape in the horizontal direction of the elevated portion 101. In FIGS. 11 and 12, the angles between an edge 102 being raised in the longitudinal direction and a front surface 103 of the elevated portion 101 are indicated by the reference numeral 104. The angles 104 may be substantially perpendicular, as shown in FIG. 11, but may also be round, as shown in FIG. 12. Another possibility is that no raised edge, a front surface and intermediate angles are present, but that the elevated portion 101 is substantially curved in its entirety in the horizontal direction, as shown in FIG. 13. At last, preferably, in both the horizontal direction and vertical direction, the elevated portion 101 may also be executed in an entirely or partially curved manner.

It will be clear to a person skilled in the art that the scope of the present invention is not limited to the examples discussed above, but that several amendments and modifications thereof are possible without deviating from the scope of the invention as defined in the appended claims.

Not only the shown embodiments of the blanking member are within the scope of the invention, but also embodiments of the blanking member in which a combination of different shown measures is present. For example, the invention also relates to a blanking member which is provided with both two recessed portions 76 and an elevated neck portion 73.

In the scope of the invention, final processing of the linking elements 10 is not at all excluded, wherein possible final processing can also be aimed at (further) reducing the variation in thickness in the horizontal transverse direction of the linking element 10.

In the scope of the invention, during a blanking process, it is possible to form both main body surfaces 11, 12 of a linking element 10 while applying two blanking members according to the invention, wherein one of the two blanking members functions as cutting member and the other of the two blanking members functions as supporting member.

It is remarked that the above-described measures with respect to the blanking member are preferably applied in the supporting member 40, because given the considerable longer life span of the supporting member 40 with respect to the cutting member 30, the cost involved in introducing the measures will in general turn out to be lower per linking element 10.

We claim:

1. Process for forming a linking element which is designed to be part of a push belt for a continuously variable transmission, comprising a step of displacing material from a central portion of a main body surface of the linking element, which surface is designed to be extending perpendicular to a circumferential direction of the push belt, and which central portion is substantially centrally located in a direction perpendicular to both a direction of the linking element corresponding to the circumferential direction of the push belt in a situation in which the linking element is part of the push belt and a direction of the linking element corresponding to a radial direction of the push belt in the situation in which the linking element is part of the push belt, in a direction of portions of the linking element which are located on either side of the central portion, by applying pressure, wherein the step is performed at least at a portion of the linking element which is located at a bottom side of the main body surface of the linking element, which side is designed to be located at an inner circumference of the push belt.

2. Process according to claim 1, the process being a blanking process in which the linking element is cut from sheet-shaped basic material, wherein a blanking member comprising a shaping surface which has successively a basic portion, a relatively narrow neck portion and a top portion in the direction of the linking element corresponding to the radial direction of the push belt in the situation in which the linking element is part of the push belt is applied, wherein at least the basic portion of the blanking member is applied to displace material from the central portion of the main body surface of the linking element.

3. Process according to claim 1, the process being a blanking process in which the linking element is cut from sheet-shaped material, wherein a blanking member comprising a shaping surface is applied, wherein the main body surface of the linking element is pressed against the shaping surface of the blanking member, and wherein the central portion of the main body surface of the linking element is subjected to a higher pressure than the portions of the linking element which are located on either side of the central portion.

4. Process according to claim 3, wherein a difference between a pressure being exerted on the central portion of the main body surface of the linking element and a pressure being exerted on the portions of the linking element which are located on either side of the central portion is realized by means of the shaping surface of the blanking member having an elevated portion.

5. Process according to claim 1, wherein material which is displaced is divided evenly over the main body surface of the linking element, in the direction perpendicular to both the direction of the linking element corresponding to the circumferential direction of the push belt in the situation in which the linking element is part of the push belt and the direction of the linking element corresponding to the radial direction of the push belt in the situation in which the linking element is part of the push belt, at a position of a convex region at the main body surface of the linking element, which is designed for guaranteeing contact between the linking element and another linking element in the push belt.

* * * * *